United States Patent
Khamesra et al.

(10) Patent No.: US 11,658,575 B2
(45) Date of Patent: May 23, 2023

(54) REGULATOR ARCHITECTURE WITH LOAD DEPENDENT BIASING AND INRUSH CURRENT CONTROL

(71) Applicant: Cypress Semiconductor Corporation, San Jose, CA (US)

(72) Inventors: Arun Khamesra, Bangalore (IN); Hemant P. Vispute, Bangalore (IN); Viral Brahmbhatt, Vadodara (IN)

(73) Assignee: Cypress Semiconductor Corporation, San Jose, CA (US)

( * ) Notice: Subject to any disclaimer, the term of this patent is extended or adjusted under 35 U.S.C. 154(b) by 75 days.

(21) Appl. No.: 17/467,074

(22) Filed: Sep. 3, 2021

(65) Prior Publication Data
US 2022/0077783 A1  Mar. 10, 2022

Related U.S. Application Data

(60) Provisional application No. 63/076,025, filed on Sep. 9, 2020.

(51) Int. Cl.
| | |
|---|---|
| H02M 3/158 | (2006.01) |
| H02M 1/00 | (2006.01) |
| G06F 13/42 | (2006.01) |
| H02M 1/08 | (2006.01) |

(52) U.S. Cl.
CPC ...... H02M 3/1582 (2013.01); G06F 13/4282 (2013.01); H02M 1/0009 (2021.05); H02M 1/08 (2013.01); G06F 2213/0042 (2013.01)

(58) Field of Classification Search
CPC .... H02M 3/1582; H02M 1/0009; H02M 1/08; G06F 13/4282
See application file for complete search history.

(56) References Cited

U.S. PATENT DOCUMENTS

| | | |
|---|---|---|
| 2015/0227147 A1 | 8/2015 | Ivanov et al. |
| 2016/0118906 A1* | 4/2016 | Freeman ........... H02M 3/33515 363/21.05 |
| 2017/0099011 A1* | 4/2017 | Freeman ................. H02M 7/06 |

OTHER PUBLICATIONS

Ricoh Electronic Devices Co., Ltd., Low on Resistance/ Low Voltage 1 Ch 500 mA/ 1.0 A Alternative LDO for Automotive Applications, RP115x-Y Series, No. EC-390-201130, 32 pages.

(Continued)

*Primary Examiner* — Adolf D Berhane
*Assistant Examiner* — Afework S Demisse (57) ABSTRACT

A USB-power delivery integrated circuit controller includes: one or more driver circuits configured to control operation of a buck-boost converter; a regulator configured to regulate an internal supply voltage of the controller from a variable input voltage of the buck-boost converter in a regulation mode, and to pass the variable input voltage as the internal supply voltage without regulation in a bypass mode, the regulator being in the bypass mode when the variable input voltage is below the internal supply voltage, the regulator including an amplifier and a pass transistor configured to pass a current that is inversely proportional to an output of the amplifier; a clamping circuit configured to limit an overdrive voltage of the pass transistor during an inrush current event; and an override circuit configured to deactivate the clamping circuit in the bypass mode when the current passed by the pass transistor is below a current threshold.

23 Claims, 7 Drawing Sheets

(56) References Cited

OTHER PUBLICATIONS

Ricoh Electronic Devices Co., Ltd., Low on Resistance/ Low Voltage 1 Ch 500 mA/ 1.0 A Alternative LDO for Industrial Applications, RP115x-Y Series, No. EA-413-190819, 32 pages.
Ricoh Electronic Devices Co., Ltd., Low on Resistance/ Low Voltage 1 Ch 500 mA/ 1.0 A Alternative LDO, RP115x-Y Series, No. EA-274-190521, 32 pages.
Texas Instruments, 350mA, Ultra-Low VIN, RF Low-Dropout Linear Regulator with Bias Pin, TPS720xx, 21 pages, 2008.

\* cited by examiner

REGULATOR ARCHITECTURE WITH LOAD DEPENDENT BIASING AND INRUSH CURRENT CONTROL

PRIORITY

This application claims the benefit of U.S. Provisional Application No. 63/076,025, filed on Sep. 9, 2020, the entire content of which is incorporated herein by reference in its entirety.

BACKGROUND

The Universal Serial Bus (USB)-Power Delivery (PD) specification permits delivery of increased power (e.g., more than 7.5 W) to devices with greater power demands. Devices can request higher currents and supply voltages from compliant hosts, e.g., up to 2 A at 5 V (up to 10 W) and optionally up to 3 A or 5 A at either 12 V (36 W or 60 W) or 20 V (60 W or 100 W). A USB-PD controller provides cable plug and orientation detection for one or more USB Type-C connectors. When cable detection and USB-PD negotiation are complete, the controller typically enables the appropriate power path, among other functions. USB-PD integrated circuit (IC) controllers include several different types of circuits on the same semiconductor die for performing these and other functions.

One such circuit included in USB-PD IC controllers is an on-chip voltage regulator. On-chip voltage regulators in USB-compliant power convertor and power delivery chips are required to generate a regulated supply from a widely varying input voltage (e.g., 4V to 40V). Load current demand may vary from 0 uA in deep-sleep mode to >150 mA in active mode. In addition, the regulator may be required to meet a minimum quiescent current (IDDQ) in deep-sleep mode. Conventional USB-PD IC controllers use two separate regulators to meet these diverging requirements: an active mode regulator that consumes higher current to support large loads; and a deep-sleep mode regulator that consumes lower (uA range) current which can only support low loads as required by the deep-sleep mode. This kind of scheme requires a sophisticated design to ensure that the regulated supply does not droop while transitioning from one power mode to another. This kind of scheme also introduces a system level complexity to support two independent voltage regulation loops trying to regulate a common output.

Inrush current presents another challenge. To suppress transients injected due to chip activities, a significant amount of capacitance at the regulator output node must be provided. When the output voltage changes by more than a Volt (during power up, accidental shorts or transition from bypass to regulation mode), the on-chip regulator tends to supply a large amount of current to the output capacitor. Such an uncontrolled current may cause electromigration in metal routings. Accordingly, the peak inrush current should be controlled. However, this requires a careful balancing of two conflicting requirements: full overdrive capability in bypass mode but limited overdrive for inrush conditions.

Thus, there is a need for an improved USB-PD IC controller with robust on-chip voltage regulation and inrush current limiting techniques.

SUMMARY

According to an embodiment of a Universal Serial Bus (USB)-Power Delivery (PD) integrated circuit (IC) controller, the USB-PD IC controller comprises: one or more driver circuits configured to control operation of a buck-boost converter; a regulator configured to regulate an internal supply voltage of the USB-PD IC controller from a variable input voltage of the buck-boost converter in a regulation mode, and to pass the variable input voltage as the internal supply voltage without regulation in a bypass mode, wherein the regulator is in the bypass mode when the variable input voltage is below the internal supply voltage, wherein the regulator comprises an amplifier and a pass transistor configured to pass a current that is inversely proportional to an output of the amplifier; a clamping circuit configured to limit an overdrive voltage of the pass transistor during an inrush current event; and an override circuit configured to deactivate the clamping circuit in the bypass mode when the current passed by the pass transistor is below a current threshold.

According to an embodiment of a method of operating a Universal Serial Bus (USB)-Power Delivery (PD) integrated circuit (IC) controller, the method comprises: controlling, by the USB-PD IC controller, external switches of a buck-boost converter electrically coupled to a USB voltage bus power line; regulating, via a regulator of the USB-PD IC controller, an internal supply voltage of the USB power delivery system from a variable input voltage of the buck-boost converter in a regulation mode and passing the variable input voltage as the internal supply voltage without regulation in a bypass mode, wherein the regulator is in the bypass mode when the variable input voltage is below the internal supply voltage, wherein the regulator comprises an amplifier and a pass transistor that passes a current that is inversely proportional to an output of the amplifier; limiting, by the USB-PD IC controller, an overdrive voltage of the pass transistor during an inrush current event; and deactivating the limiting of the overdrive voltage in the bypass mode when a scaled down replica of the current passed by the pass transistor is below a reference current.

According to an embodiment of a Universal Serial Bus (USB)-Power Delivery (PD) device, the USB-PD device includes: a buck-boost converter; and a USB-PD integrated circuit (IC) controller coupled to control operation of the buck-boost converter, the USB-PD IC controller comprising: a regulator configured to regulate an internal supply voltage of the USB-PD IC controller from a variable input voltage of the buck-boost converter in a regulation mode, and to pass the variable input voltage as the internal supply voltage without regulation in a bypass mode, wherein the regulator is in the bypass mode when the variable input voltage is below the internal supply voltage, wherein the regulator comprises an amplifier and a pass transistor configured to pass a current that is inversely proportional to an output of the amplifier; a clamping circuit configured to limit an overdrive voltage of the pass transistor during an inrush current event; and an override circuit configured to deactivate the clamping circuit in the bypass mode when the current passed by the pass transistor is below a current threshold.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide a USB-PD IC controller, method of operating a USB-PD IC controller, and a USB-PD device that includes a buck-boost converter and the USB-PD IC controller with robust on-chip voltage regulation and inrush current limiting techniques. The USB-PD IC controller includes a regulator for regulating an internal supply voltage of the USB-PD IC controller from a variable input voltage of a buck-boost converter in a regulation mode. The regulator passes the variable input voltage as the internal supply voltage without regulation in a bypass mode. The regulator, which includes an amplifier and a pass transistor for passing a current that is inversely proportional to an output of the amplifier, is in the bypass mode when the variable input voltage is below the internal supply voltage. A clamping circuit included in the USB-PD IC controller limits an overdrive voltage of the pass transistor during an inrush current event, and an override circuit included in the USB-PD IC controller deactivates the clamping circuit in the bypass mode when the current passed by the pass transistor is below a current threshold. Separately or in combination, the USB-PD IC controller may include a bias generator that generates a bias current for the amplifier of the regulator. The bias current ranges from a minimum bias current for a deep sleep mode in which the regulator is in a low drive mode with no-load current to a maximum bias current for an active mode in which the regulator is active, e.g., when instructions are being executed by the USB-PD IC controller.

Described next, with reference to the figures, are exemplary embodiments of the USB-PD IC controller, method of operating the USB-PD IC controller, and a USB-PD device that includes the USB-PD IC controller.

Figure 1:
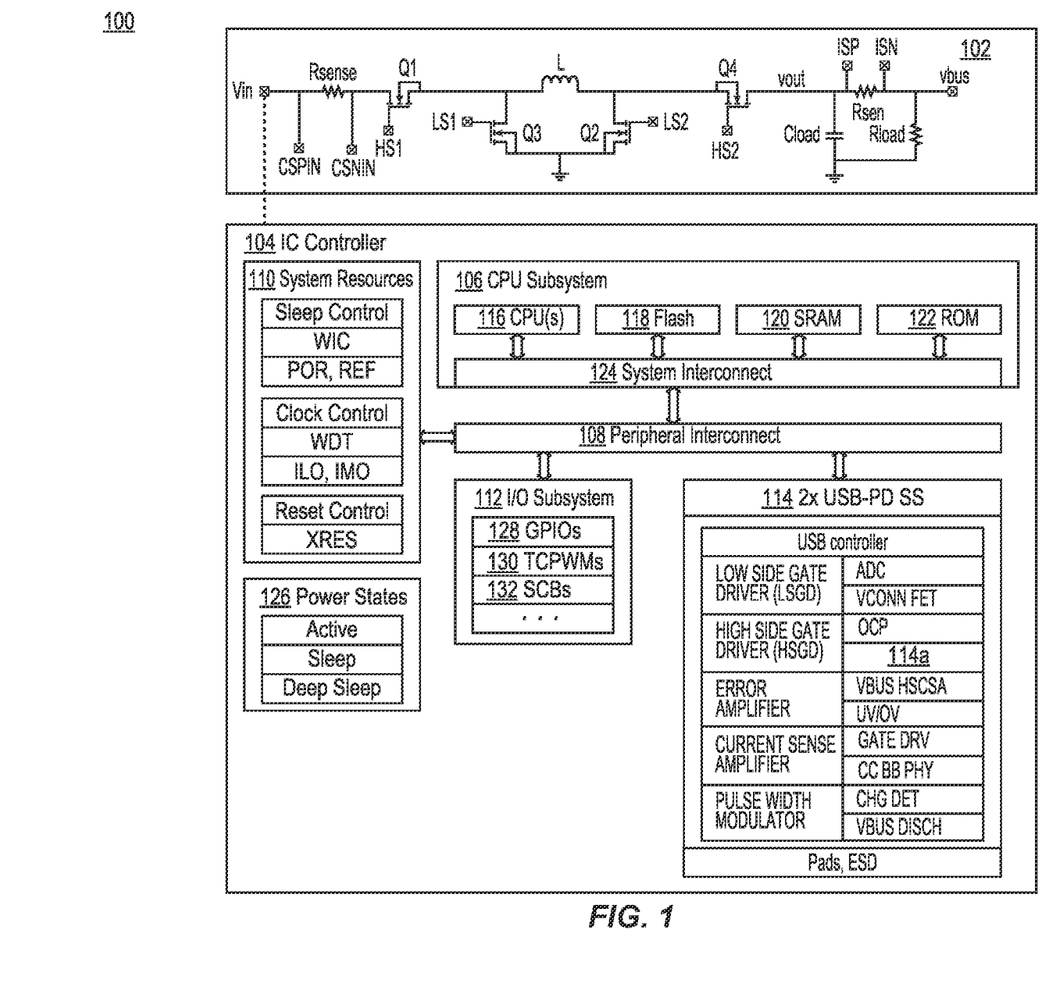
FIG. 1 illustrates a block diagram of an embodiment of a USB-PD device that includes a buck-boost converter and a USB-PD IC controller coupled to control operation of the buck-boost converter.

FIG. 1 illustrates a block diagram of an embodiment of a USB-PD device 100 that includes a buck-boost converter 102 and a USB-PD IC controller 104 coupled to control operation of the buck-boost converter 102. The buck-boost converter 102 has a variable input voltage Vin that varies, e.g., in a range of 3.6V to 40V and four switches Q1, Q2, Q3, Q4 such as NFETs (n-channel MOSFETs) coupled to an inductor L.

The USB-PD IC controller 104 drives the external switches Q1, Q2, Q3, Q4 of the buck-boost converter 102 via respective signals HS1, LS2, LS1, HS2 to regulate the voltage Vout of a USB voltage bus power (VBUS) line to which one or more USB Type-C devices are connected. This may include switching between one or more buck modes and one or more boost modes, depending on the power demand and input voltage level. The load(s) coupled to the VBUS line are represented by a capacitor Cload and corresponding resistor Rload.

The USB-PD IC controller 104 may be a single-chip IC controller manufactured on a semiconductor die. For example, the USB-PD IC controller 104 may be a single-chip IC device from the family of CCGxx USB controllers developed by Cypress Semiconductor Corporation, San Jose, Calif. In another example, USB-PD IC controller 104 may be a single-chip IC that is manufactured as a System-on-Chip (SoC). In other embodiments, the USB-PD IC controller 104 may be a multi-chip module encapsulated in a single semiconductor package. Among other components, the USB-PD IC controller 104 includes a central processing unit (CPU) subsystem 106, peripheral interconnect 108, system resources 110, input/output (I/O) subsystem 112, USB-PD subsystem 114, and various terminals (e.g., pins) that are configured for receiving and sending signals.

The CPU subsystem 106 includes one or more CPUs 116, flash memory 118, SRAM (Static Random Access Memory) 120, and ROM (Read Only Memory) 122 that are coupled to system interconnect 124. The CPU 116 is a suitable processor that can operate in an IC or a SoC device. The flash memory 118 is non-volatile memory (e.g., NAND flash, NOR flash, etc.) that is configured for storing data, programs, and/or other firmware instructions. The flash memory 118 is tightly coupled within the CPU subsystem 106 for improved access times. The SRAM 120 is volatile memory that is configured for storing data and firmware instructions accessed by the CPU 116. The ROM 122 is read-only memory (or other suitable storage medium) that is configured for storing boot-up routines, configuration parameters, and other firmware parameters and settings. System interconnect 124 is a system bus (e.g., a single-level or multi-level Advanced High-Performance Bus, or AHB) that is configured as an interface that couples various components of the CPU subsystem 106 to each other, as well as a data and control interface between the various components of the CPU subsystem 106 and the peripheral interconnect 108.

The peripheral interconnect 108 is a peripheral bus (e.g., a single-level or multi-level AHB) that provides the primary data and control interface between the CPU subsystem 106 and its peripherals and other resources, such as the system resources 110, subsystem 112, and USB-PD subsystem 114. The peripheral interconnect 108 may include various controller circuits (e.g., direct memory access, or DMA controllers), which may be programmed to transfer data between peripheral blocks without burdening the CPU subsystem 106. In various embodiments, each of the components of the CPU subsystem 106 and the peripheral interconnect 108 may be different with each choice or type of CPU, system bus, and/or peripheral bus.

The system resources 110 include various electronic circuits that support the operation of USB-PD IC controller 104 in its various states and modes. For example, the system resources 110 may include a power subsystem having analog and/or digital circuits required for each controller state/mode such as, for example, sleep control circuits, wake-up interrupt controller (WIC), power-on-reset (POR), voltage and/or current reference (REF) circuits, etc. In some embodiments, the power subsystem may also include circuits that allow the USB-PD IC controller 104 to draw and/or provide power from/to external sources with several different voltage and/ or current levels and to support controller operation in several power states 126 (e.g., such as active state, sleep state, and a deep sleep state with clocks turned off). Further, in some embodiments the CPU subsystem 106 may be optimized for low-power operation with extensive clock gating and may include various internal controller circuits that allow the CPU 116 to operate in the various power states 126. For example, the CPU 116 may include a wake-up interrupt controller that is configured to wake the CPU 116 from a sleep state, thereby allowing power to be switched off when the IC chip is in the sleep state. The system resources 110 may also include a clock subsystem having analog and/or digital circuits for clock generation and clock management such as, for example, clock control circuits, watchdog timer (WDT) circuit(s), internal low-speed oscillator (ILO) circuit(s), and internal main oscillator (IMO) circuit(s), etc. The system resources 110 may also include analog and/or digital circuit blocks that provide reset control and support external reset (XRES).

In various embodiments, the I/O subsystem 112 may include various different types of I/O blocks and subsystems. For example, the I/O subsystem 112 may include GPIO (general purpose input output) blocks 128, TCPWM (timer/counter/pulse-width-modulation) blocks 130, and SCBs (serial communication blocks) 132. The GPIOs 128 include analog and/or digital circuits configured to implement various functions such as, for example, pull-ups, pull-downs, input threshold select, input and output buffer enabling/disabling, multiplex signals connected to various I/O pins, etc. The TCPWMs 130 include analog and/or digital circuits configured to implement timers, counters, pulse-width modulators, decoders and various other analog/mixed signal elements that are configured to operate on input/output signals. The SCBs 132 include analog and/or digital circuits configured to implement various serial communication interfaces such as, for example, I2C, SPI (serial peripheral interface), UART (universal asynchronous receiver/transmitter), CAN (Controller Area Network) interface, CXPI (Clock eXtension Peripheral Interface), etc.

The USB-PD subsystem 114 provides the interface to one or more USB Type-C ports and is configured to support USB communications as well other USB functionality, such as power delivery and battery charging. For example, one Type-C port may be coupled to the buck-boost converter 102. The USB-PD subsystem 114 includes the electro-static discharge (ESD) protection circuits required on a Type-C port. The USB-PD subsystem 114 also includes a Type-C transceiver and physical layer logic (PHY), which are configured as an integrated baseband PHY circuit to perform various digital encoding/decoding functions (e.g., Biphase Mark Code-BMC encoding/decoding, cyclical redundancy checks-CRC, etc.) and analog signal processing functions involved in physical layer transmissions. The USB-PD subsystem 114 also provides the termination resistors (RP and RD) and their switches, as required by the USB-PD specification, to implement connection detection, plug orientation detection, and power delivery roles over a Type-C cable. The USB-PD IC controller 104 (and/or the USB-PD subsystem 114 thereof) may also be configured to respond to communications defined in a USB-PD Specification such as, for example, SOP (start-of-packet), SOP', and SOP" messaging.

Among other circuitry, The USB-PD subsystem 114 may further include: one or more analog-to-digital convertors (ADCs) for converting various analog signals to digital signals; a VCONN FET; an error amplifier (ERROR AMP) for controlling the power source voltage applied to the VBUS line per a PD contract; a regulator 114a for converting the power supply voltage to the precise voltage (e.g., 3-5V) needed by the USB-PD IC controller 104; a current sense amplifier (CSA) and an over-voltage protection (OVP) circuits for providing over-current (OCP) and over-voltage (OV) protection and under-voltage (UV) protection on the VBUS line with configurable thresholds and response times, e.g., via respective sense pins CSPIN, CSNN coupled to a first sense resistor Rsense and respective sense pins ISP, ISN coupled to a second sense resistor Rsen; a pulse width modulator (PWM); one or more gate drivers (GATE DRV) for controlling power switches (not shown) that turn ON and off the provision of power over the VBUS line; a low-side gate driver (LSDR), a high-side gate driver (HSDR) for controlling the switches Q1, Q2, Q3, Q4 of the buck-boost converter 102; a communication channel PHY (CC BB PHY) logic for supporting communications on a Type-C Communication Channel (CC) line; a charging protocol detection block (CHG DET) to detect different type of PD chargers; and at least two on-die discharge (VBUS DISCH) circuits that can discharge the VBUS line voltage to any of range of programmable voltage levels.

Described next in more detail are the internal regulation functions implemented by the USB-PD IC controller 104.

Figure 2:
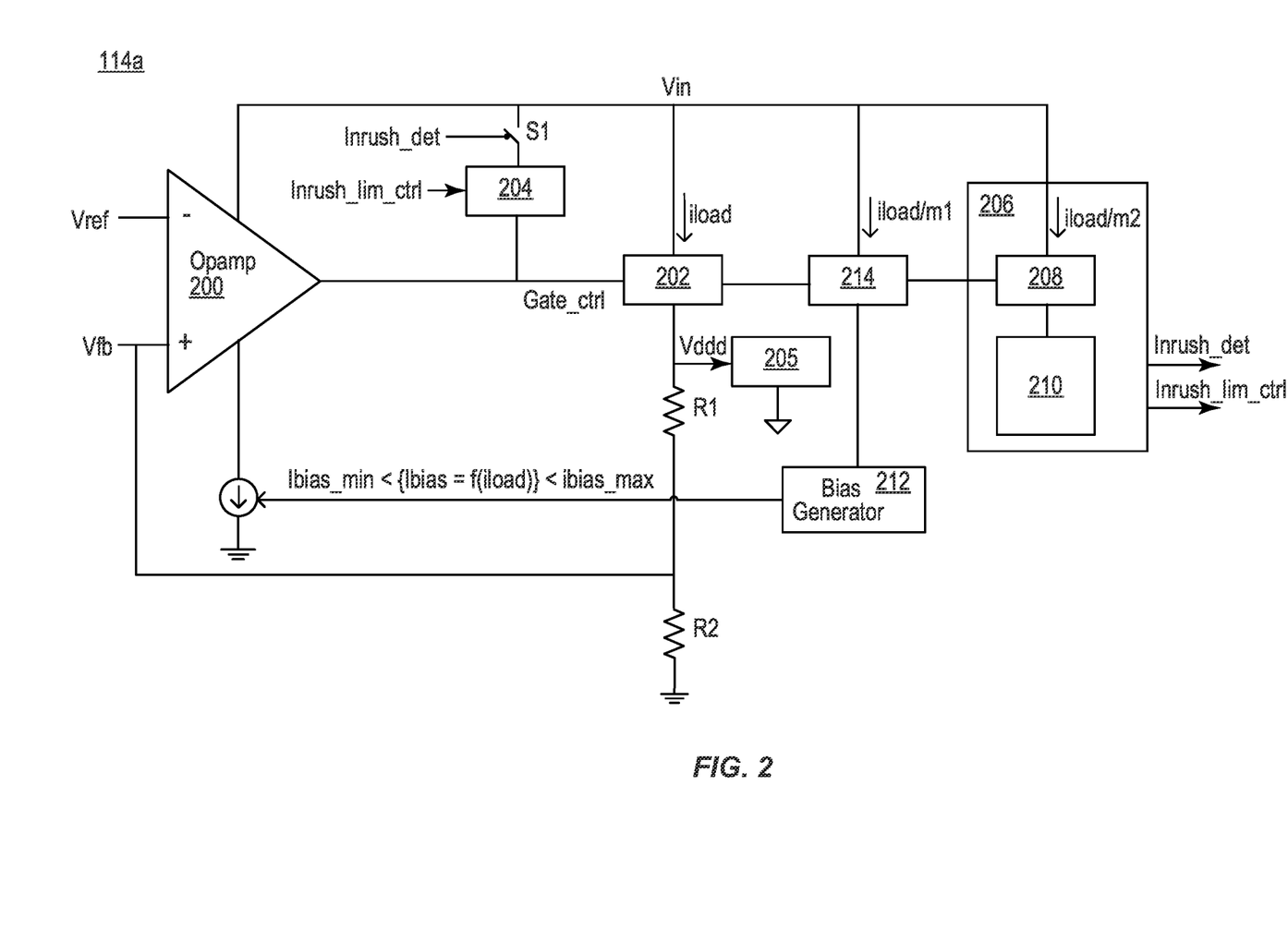
FIG. 2 illustrates the internal regulator of the USB-PD IC controller in more detail.

FIG. 2 illustrates the internal regulator 114a of the USB-PD IC controller 104 in more detail. The regulator 114a regulates an internal supply voltage Vddd of the USB-PD subsystem 114 from the variable input voltage Vin of the buck-boost converter 102 in a regulation mode. The internal supply voltage Vddd supplies power to various loads 205 included in the USB-PD subsystem 114, e.g., such as the USB-PD subsystem circuits shown in FIG. 1. The regulator 114a passes the variable input voltage Vin as the internal supply voltage Vddd without regulation in a bypass mode. The regulator 114a is in the bypass mode when the variable input voltage Vin is below the internal supply voltage Vddd. In one embodiment, the internal supply voltage Vddd is regulated to 5V in the regulation mode and the regulator 114a is in the bypass mode when the variable input voltage Vin is below 5V.

The internal regulator 114a of the USB-PD IC controller 104 includes an amplifier 200 and a pass transistor 202 configured to pass a current iload that is inversely proportional to the output 'Gate_ctrl' of the amplifier 200. The amplifier 200 may be configured as an operational amplifier (opamp) with closed-loop feedback where a reference voltage 'Vref' is input to the negative input of the amplifier 200 and a portion 'Vfb' of the pass transistor 202 output Vddd is applied to the non-inverting input of the amplifier 200 via a voltage divider R1, R2.

A clamping circuit 204 limits the overdrive voltage of the pass transistor 202 during an inrush current event, where the overdrive voltage is the voltage (Vgs) between the gate and source of the pass transistor 202 in excess of the threshold voltage (Vth) of the pass transistor 202. An inrush current event may occur, e.g., when power is initially applied to the system, when transients are injected due to chip activities, or when a short circuit occurs on the USB type-C Vconn supply output. Limiting the overdrive voltage of the pass transistor 202 during an inrush current event helps to limit the inrush current, allowing the USB-PD IC controller 104 to avoid damage due to electromigration during inrush current event.

However, limiting the overdrive voltage of the pass transistor 202 in the bypass mode makes it less likely the internal regulator 114a can meet the current demand with low Vds (drain-to-source voltage) drop across the pass transistor 202. The conflicting requirements of full overdrive in bypass mode and limited overdrive for inrush conditions is addressed herein by limiting the overdrive of the pass transistor 202 only during inrush current events.

To this end, the internal regulator 114a of the USB-PD IC controller 104 includes an override circuit 206 that deactivates the clamping circuit 204 in the bypass mode when the current iload passed by the pass transistor 202 is below a current threshold Iref. In one embodiment, the override circuit 206 includes a current mirror 208 that mirrors a fraction iload/m2 of the current iload passed by the pass transistor 202, and a comparator circuit 210 that compares the mirrored current iload/m2 with the current threshold Iref and activates a signal Inrush_det when the mirrored current iload/m2 is higher than the current threshold Iref. The activated signal Inrush_det causes a deactivation switch S1 to close, thereby electrically coupling the variable input voltage Vin to the clamping circuit 204 when the mirrored current iload/m2 is higher than the current threshold Iref. Otherwise, in the bypass mode, the variable input voltage Vin is decoupled from the clamping circuit 204 and the pass transistor 202 achieves full overdrive.

The current mirror 208 of the override circuit 206 is a scaled down replica of the pass transistor 202. Having the same gate control Gate_ctrl as the pass transistor 202, the current mirror 208 of the override circuit 206 mirrors a fraction (1/m2) of the load current iload supplied by the pass transistor 202. The current iload/m2 in the current mirror 208 is compared against the current threshold Iref in the comparator circuit 210. When iload/m2 is greater than Iref, the comparator output Inrush_det goes high and an inrush current event is considered detected. As Inrush_det goes high, the deactivation switch S1 controlled by Inrush_det is closed and the gate of the pass transistor 202 is limited by the clamping circuit 204. The clamping circuit 204, when active, prevents the signal Gate_ctrl from dropping further, thereby limiting the overdrive of the pass transistor 202 during the inrush current event. In the bypass mode, as actual current through the pass transistor 202 is less than the current threshold Iref, the signal Inrush_det remains low and the clamping circuit 204 does not limit the signal Gate_ctrl which allows the pass transistor 202 to achieve full overdrive.

Separately or in combination, the internal regulator 114a of the USB-PD IC controller 104 includes a bias generator 212 that generates a bias current Ibias for the amplifier 200 of the regulator 114a. The bias current Ibias ranges from a minimum bias current Ibias_min for a deep sleep mode in which the regulator 114a is in a low drive mode with no-load current to a maximum bias current Ibias_max for an active mode in which the regulator 114a is regulating the internal supply voltage Vddd of the USB-PD IC controller 104.

If used in combination with the inrush current technique described above, the biasing technique further improves the accuracy of the inrush current limiting clamp implemented by the clamping circuit 204. As the clamping circuit 204 tries to limit the inrush current by limiting the gate voltage of the pass transistor 202, actual inrush current might show large variation with process, voltage, and temperature changes. The inrush limiting clamp implemented by the clamping circuit 204 may be adjusted by a closed-loop negative feedback system to reduce this variation. For example, the current iload/m2 in the current mirror 208 of the override circuit 206 may be subtracted from the current threshold Iref, which represents the desired inrush current limit, and generates an adjustment signal Inrush_lim_ctrl, which is proportional to the error. The adjustment signal Inrush_lim_ctrl adjusts the inrush limiting clamp implemented by the clamping circuit 204 such that the error is reduced.

In one embodiment, the override circuit 206 generates an error current Ierr based on the difference between the mirrored current iload/m2 and a fixed reference Iref. The override circuit 206 generates the adjustment signal Inrush_lim_ctrl proportional to the error current Ierr. The overdrive voltage limit implemented by the clamping circuit 204 is adjusted based on the adjustment signal Inrush_lim_ctrl such that the error current is reduced.

In addition to the inrush current detection and control technique, the internal regulator 114a of the USB-PD IC controller 104 also supports both active and deep-sleep modes. The regulator 114a offers very low quiescent current for deep-sleep mode and supports loads up to hundreds of milliamps for active mode. The regulator 114a is biased with a low current to meet deep-sleep quiescent current and with a higher biasing current in active mode to avoid stability issues while supporting loads higher than a few milliamps. The bias generator 212 meets the requirements of both deep-sleep and active modes by adjusting the bias current Ibias as a function 'f(iload)' of the load current iload. For example, under no-load conditions, the amplifier 202 may be biased with minimum current Ibias_min, thereby meeting the low quiescent current requirement of deep-sleep mode. The bias generator 212 increases the amplifier bias current as load current increases to avoid stability issues at higher loads. Under maximum load conditions, the amplifier 202 may be biased with a maximum current Ibias_max.

Such an arrangement does not require any switching while moving from one mode to another and hence simplifies the transitions. For example, in one embodiment, a second current mirror circuit 214 is a scaled down replica of the pass transistor 202 and shares the same gate control Gate_ctrl with both the first current mirror 208 and the pass transistor 202. Accordingly, the second current mirror circuit 214 mirrors a fraction (1/m1) of the load current iload supplied by the pass transistor 202. The bias generator 212 senses the scaled-down load current iload/m1 in the second current mirror circuit 214 and adjusts the bias current Ibias of the amplifier 200 such that the bias generator 212 can support hundreds of milliamps of current without affecting amplifier stability.

The inrush current detection and control technique is described next in more detail with reference to FIGS. 3 through 5.

Figure 3:
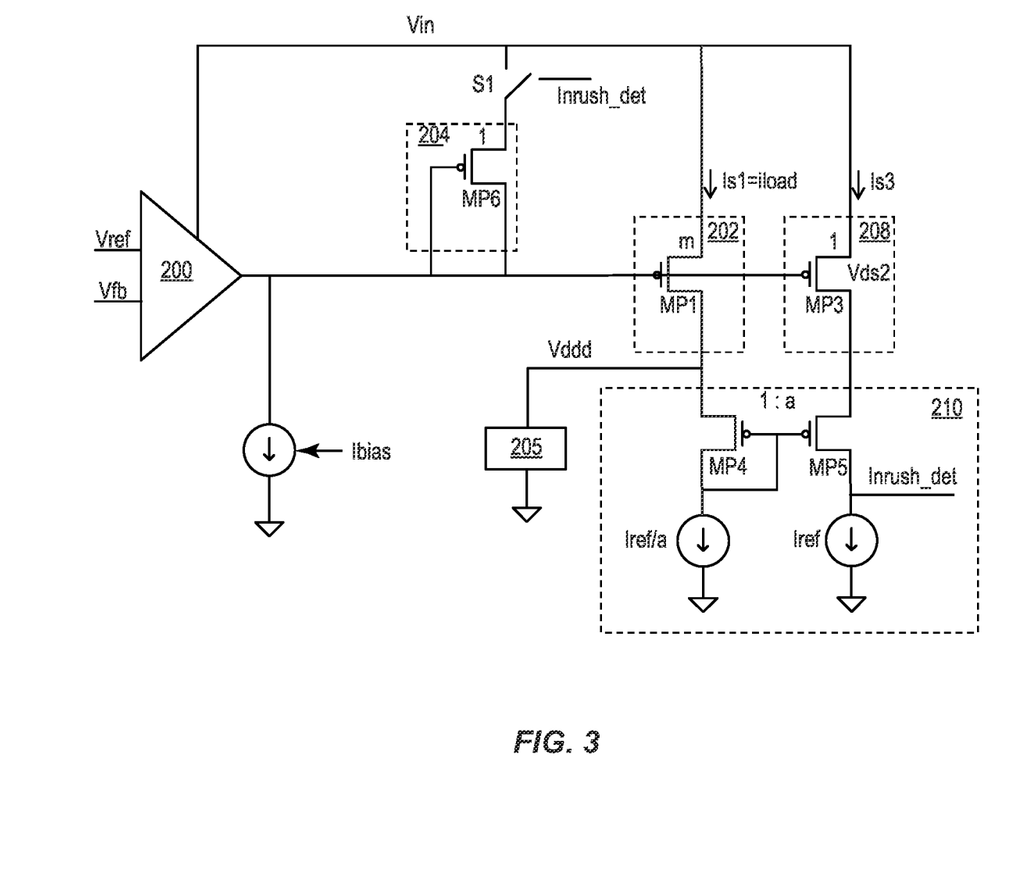
FIG. 3 illustrates an embodiment of an override circuit for the internal regulator.

FIG. 3 illustrates an embodiment of the override circuit 206 in more detail. According to this embodiment, the pass transistor 202 is a PFET (p-channel MOSFET) MP1. The source of PFET MP1 is electrically coupled to the variable input voltage Vin. The internal supply voltage Vddd is provided at the drain of PFET MP1. The gate of PFET MP1 is electrically coupled to the output of the amplifier 200. The clamping circuit 204 also includes PFET MP6. The gate and drain of PFET MP6 are electrically together to the gate of PFET MP1. The source of PFET MP6 is electrically coupled to the deactivation switch S1 of the override circuit 204.

The current mirror 208 of the override circuit 206 includes current mirror PFET MP3. PFET MP3 is a scaled down replica of PFET MP1. By sharing the same source and gate with PFET MP1, PFET MP3 mirrors a fraction (1/m2) of the current iload supplied by PFET MP1. Current Is3 in PFET MP3 proportionally represents the total current iload supplied by the regulator 114a to the internal loads 205 of the USB-PD subsystem 114. Current Is3 is in proportion to iload as given by:

$$Is3/Iload = N3/N1 = 1/m2 \qquad (1)$$

where N1 is the size of PFET MP1 and N3 is the size of PFET MP3.

The comparator 210 of the override circuit 206 compares current Is3 against a reference current Iref. PFET MP3 and the comparator 210 form an inrush detection circuit. When Is3>Iref, the output Inrush_det of the inrush detector circuit goes high and an inrush current event is considered detected. The deactivation switch S1 electrically coupled in series between the variable input voltage Vin and the source of PFET MP6 closes when the current comparator 210 indicates the mirrored current iload/m2 is higher than the reference current Iref. Load current at this point is given by:

$$Iload\_det = Iref*m \qquad (2)$$

PFETs MP4 and MP5 form a cascode circuit that improve the mirroring between PFET MP1 and PFET MP3.

As inrush detection happens, the clamping circuit 204 is activated by the deactivation switch S1 and PFET MP6 supplies all of current Iref1 sunk by amplifier 200 (Iref1 is not shown in FIG. 3 and may be the same or higher than Iref). As the entire Iref1 current sunk by the amplifier 200 is provided by PFET MP6, the regulator loop no longer controls the gate of PFET MP1 which becomes clamped to Vin−Vgs6 where Vgs6 is the gate-to-source voltage of PFET MP6. In this configuration, PFET MP6 forms a mirror with PFET MP1 and current in PFET MP1 becomes fixed at:

$$Iload\_lim = Iref1*(N1/N6) = Iref1*m \qquad (3)$$

There is a hysteresis provided in the comparator 210 using the Inrush_det signal to reduce Iref to Iref_hyst so that when iload through the pass transistor 202 is limited to iload_lim, it does not cause Inrush_det to go low again. Unless load current on Vddd goes lower, such that Is3 is lower than Iref_hyst, the Inrush_det signal remains high.

In the bypass mode, as current supplied by PFET MP1 is lower than iload_det, the clamping circuit 204 is off/deactivated and PFET MP1 is subject to full overdrive. However, when the current in PFET MP1 tries to go above iload_det, an inrush current event is detected and current is again restricted to iload_lim.

The detect-and-limit scheme described above may be subject to accuracy with change in process, voltage, and temperature. For example, over a wider range of Vin and while regulating Vddd to 5V from a higher value of Vin (e.g., 40V), PFET MP1 would experience a large Vds (drain-to-source voltage). However, PFET MP6 experiences a smaller Vds=Vgs6. Such a disparity in Vds between PFET MP1 and PFET MP6 can cause a large amount of mirroring error between MP1 and MP6. This can lead to iload_lim showing large variation with Vin.

Figure 4:
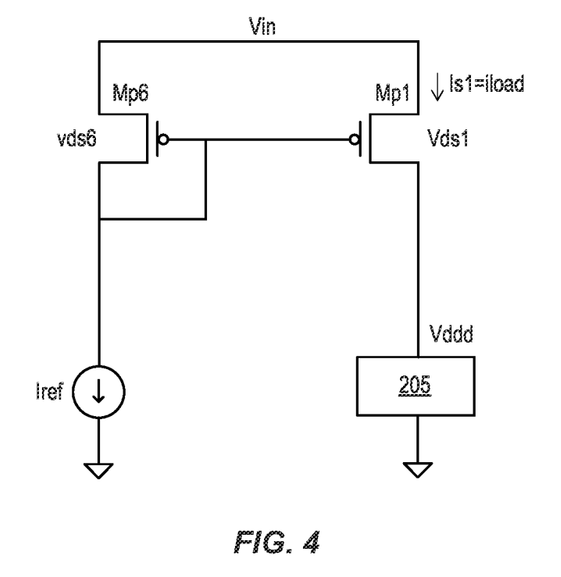
FIG. 4 illustrates a current mirror configuration during a detected inrush current event.

FIG. 4 illustrates PFET MP1 and PFET MP6 in a current mirror configuration during a detected inrush current event. With channel length modulation coefficient λ and m=N1/N6, the current Is1 in PFET MP1 in the mirroring configuration is given by:

$$Is1 = m * \frac{(1 + \lambda\ Vds1)}{(1 + \lambda\ Vds6)} * Iref \qquad (4)$$

If Vds1≈Vds6, Is1=m*Iref. The mirroring error due to large difference between Vds1 and Vds6 is given by:

$$Ierr' = Is1 - m*Iref \qquad (5)$$

$$= \frac{m\lambda(vds1 - vds6)}{1 + \lambda vds6} * Iref \qquad (6)$$

If λ<<1, $$Ierr' = \lambda(vds1 - vds6)*m*Iref \qquad (7)$$

This error can be reduced by using a replica of PFET MP3 shown in FIG. 3, to implement a closed loop negative feedback system.

Figure 5:
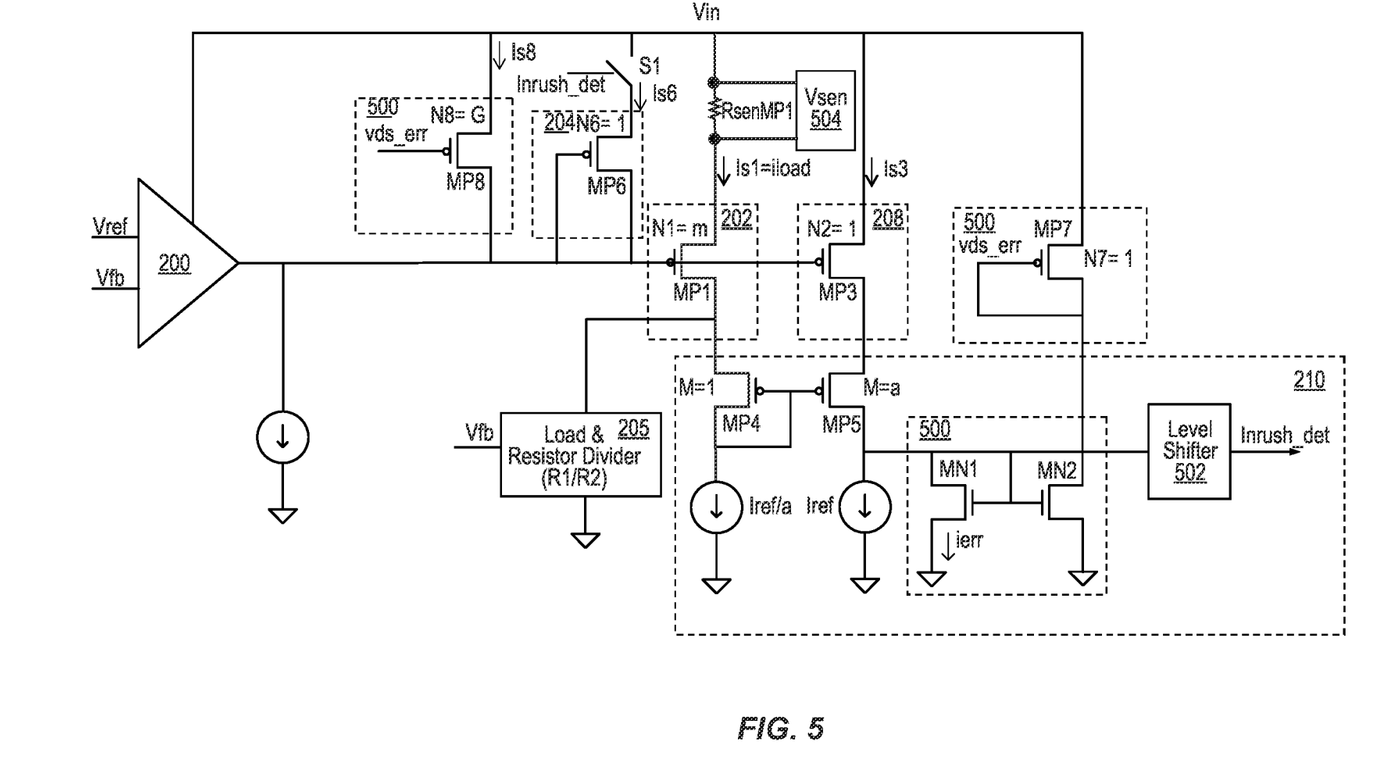
FIG. 5 illustrates an embodiment of a closed-loop negative feedback system for reducing error for the current mirror configuration.

FIG. 5 illustrates an embodiment of the closed loop negative feedback system for reducing the error for the current mirror configuration discussed above. According to this embodiment, the closed loop negative feedback system implemented by the override circuit 206 includes an error reduction circuit 500 electrically coupled to the cascode circuit MP4/MP5. The error reduction circuit 500 mirrors the error current Ierr which corresponds to the difference between the mirrored current Is3 and the reference current Iref, and further adjusts the overdrive voltage limit implemented by the clamping circuit 204 based on the error current Ierr.

In one embodiment, the error reduction circuit 500 includes a first PFET MP8 having a gate controlled by vds_err, a source electrically coupled to the variable input voltage Vin, and a drain electrically coupled to both a current source that generates the reference current Iref and the gate of the pass transistor 202. The error reduction circuit 500 further includes a first NFET MN1 into which the error Ierr current flows, a second NFET MN2 configured to mirror the error current Ierr flowing in NFET MN1, and a second PFET MP7 having a source electrically coupled to the variable input voltage Vin and a gate and a drain electrically coupled together to a drain of the NFET MN2. NFET MN1, NFET MN2, PFET MP7 and PFET MP8 form a gain stage. The magnitude of the error current Ierr is inversely proportional to the gain (G) of the gain stage. The error reduction circuit 500 senses the current flowing in the pass transistor 202 and the PFET MP7 and generates an error signal vds_err for controlling the reference current Iref to reduce an inrush limiting error of the override circuit 206.

In more detail, PFET MP3 mirrors the current Is1 into PFET MP1 with the same ratio m=N1/N6=N1/N3. Due to drain matching cascode devices MP4 and MP5, PFET MP3 mirrors MP1 current Is1 with minimum error. Current Is3 in PFET MP3 is compared against Iref. Mirroring error Ierr in Is3 with respect to Iref flows into NFET MN1 where Ierr is given by:

$$Ierr = Is3 - Iref = Is1/m - Iref \qquad (8)$$

NFET MN2 and PFET MP7 mirror the error current Ierr into PFET MP8 as G*Ierr. The current Is8 in PFET MP8 is given by:

$$Is8 = G*I7 = G*Ierr$$

This approach behaves as a closed-loop negative feedback system which tries to minimize Ierr. PFET MP3 and current source Iref behave as an error amplifier with gain=1. NFET MN1, NFET MN2, PFET MP7 and PFET MP8 form the gain stage, as explained above. PFET MP8 and PFET MP3 form the feedback path. Some key relationship equations follow:

$$Is3 = \frac{(1+\lambda\ Vds1)}{(1+\lambda\ Vds6)} * Is6 \quad (9)$$

$$Is6 = Iref - G*Ierr \quad (10)$$

$$Is1 = m*Is3 \quad (11)$$

$$Ierr = Is3 - Iref \quad (12)$$

Equations (9), (10) and (12) yield:

$$Ierr = \frac{\lambda(vds1 - vds6)}{(G+1) + \lambda(G*vds1 + vds6)} * Iref \quad (13)$$

where the error current Ierr reduces with increasing gain G of the gain stage formed by NFET MN1, NFET MN2, PFET MP7 and PFET MP8.

The current Is3 in PFET MP3 in relationship with Iref is given by:

$$Is3 = \frac{1+\lambda vds1}{1 + (G/G+1)*\lambda vds1} * Iref \quad (14)$$

The current Is1 in PFET MP1 is given by:

$$Is1 = m * \frac{1+\lambda vds1}{1 + (G/G+1)*\lambda vds1} * Iref \quad (15)$$

The override circuit 206 may include a level shifter 502 for generating the inrush current activation signal Inrush_det.

In another embodiment, the override circuit 206 may include a sense resistor RsenMP1 in series with the pass transistor 202 along with a voltage sensing (Vsen) circuit 504 across RsenMP1 and deactivate the clamping circuit 204 in the bypass mode when a voltage across the sense resistor RsenMP1 is below a voltage threshold.

Separately or in combination, the clamping circuit 204 may alter the reference input Vref of the amplifier 202 of the internal regulator 114a when an inrush current event is detected, to limit the overdrive voltage of the pass transistor 202.

The load-dependent biasing technique is described next in more detail with reference to FIGS. 6 and 7.

Figure 6:
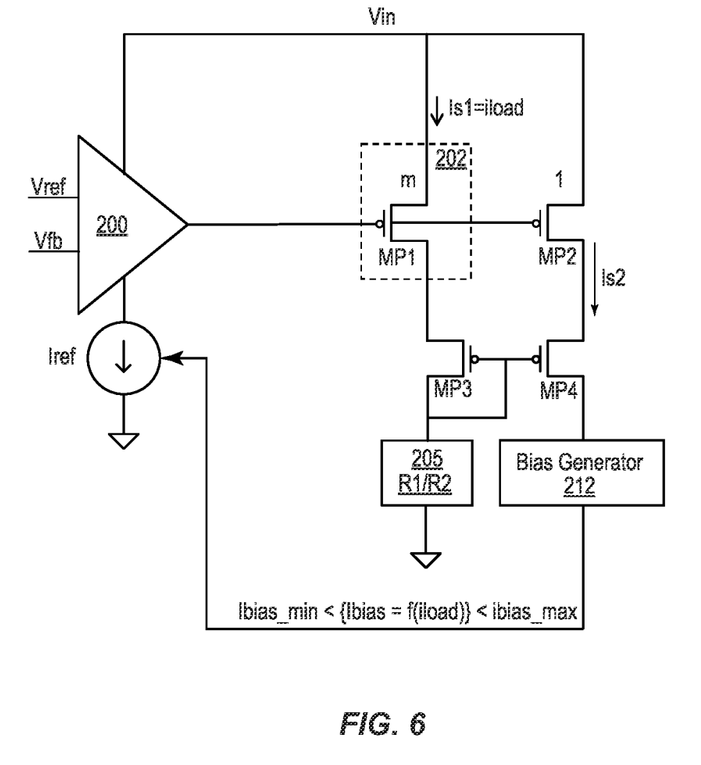
FIG. 6 illustrates an embodiment of a load-dependent bias generator for the internal regulator of the USB-PD IC controller.

FIG. 6 illustrates an embodiment of the load-dependent biasing technique according to which PFET MP2 is a replica of the pass transistor 202 with a mirror ratio MP1:MP2=m:1. PFETs MP3 and MP4 are configured as a cascode circuit, as explained above, to reduce the mirroring error between PFETs MP1 and MP2 due to channel length modulation.

The loop illustrated in FIG. 6 is designed to meet the deep-sleep quiescent current requirement at no-load with sufficient gain and phase margins. This condition dictates the minimum bias generator current requirement Ibias_min for the amplifier 200. The bias generator 212 ensures that the amplifier 200 is biased with Ibias_min when iload=0 uA, thereby meeting the low quiescent current requirement of deep-sleep mode. As iload increases, the bias generator 212 senses the incremental increase in iload and linearly increases Ibias in proportion with iload up to Ibias_max.

A bias current linearly increased this way helps move the internal poles, including the one arising from the gate of the pass element 202, towards higher frequencies and maintain the same logarithmic scale distance from the dominant output pole. Thus, as the USB-PD IC controller 104 goes from deep-sleep mode to active mode or vice-versa, the internal regulator 114a does not undergo any switching.

The bias current Ibias provided by the bias generator 212 may be expressed as:

$$Ibias=Ibias\_min+(1/m)*iload;iload<iload\_thres \quad (16)$$

$$Ibias=Ibias\_max;iload>iload\_thres \quad (17)$$

where 1/m is the size difference ratio between PFET MP1 and PFET MP2. The threshold iload_thres may be chosen in such a way that Ibias_max<<iload_thres so that power efficiency of the amplifier 200 is high. If power efficiency is important even at full load, iload_thres may be chosen such that iload_thres=iload_max. Ibias_min and Ibias_max may be programmable and varied depending on the design requirement.

Figure 7:
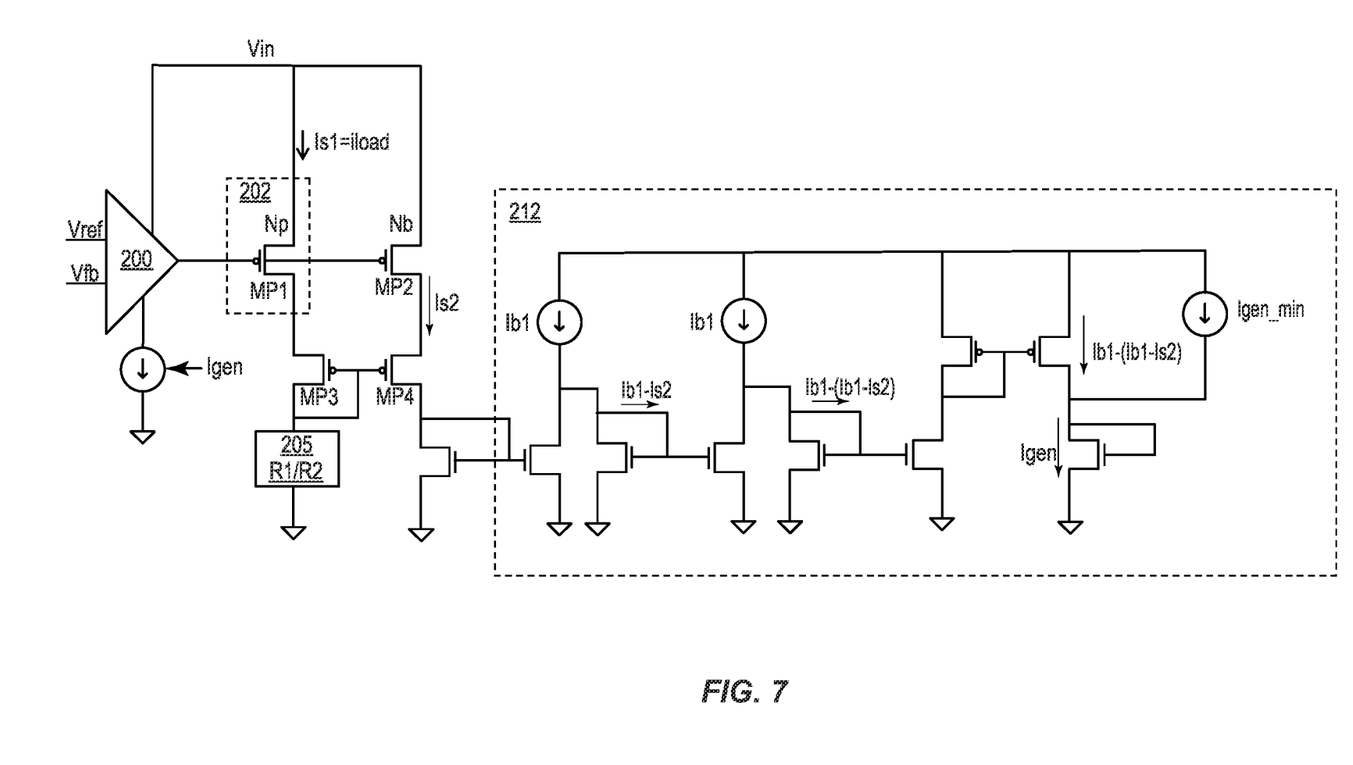
FIG. 7 illustrates another embodiment of a load-dependent bias generator for the internal regulator of the USB-PD IC controller.

FIG. 7 illustrates an embodiment of the bias generator 212. According to this embodiment, the current Igen generated by the bias generator 212 is may be expressed by:

$$Igen=Igen\_min+[Ib1-(Ib1-Is1)] \quad (18)$$

When current Is2 in PFET MP2 is zero:

$$Igen=Igen\_min \quad (19)$$

Igen attains the maximum value Igen_max when Is2=Ib1 or Is2>Ib1 as given by:

$$Igen\_max=Igen\_min+Ib1 \quad (20)$$

The load value for which Igen_max occurs is given by:

$$Iload=(Np/Nb)*Ib1 \quad (21)$$

The bias generator embodiment linearly adjusts the bias current Ibias based on iload. Accordingly, IDDq of the amplifier 200 is scaled based on load current. However, the bias generator 212 may be simplified, e.g., by providing 2 discrete bias current levels: 1 for deep-sleep mode; and 1 for active mode.

Although the present disclosure is not so limited, the following numbered examples demonstrate one or more aspects of the disclosure.

Example 1

A Universal Serial Bus (USB)-Power Delivery (PD) integrated circuit (IC) controller, the USB-PD IC controller comprising: one or more driver circuits configured to control operation of a buck-boost converter; a regulator configured to regulate an internal supply voltage of the USB-PD IC controller from a variable input voltage of the buck-boost converter in a regulation mode, and to pass the variable input voltage as the internal supply voltage without regulation in a bypass mode, wherein the regulator is in the bypass mode when the variable input voltage is below the internal supply voltage, wherein the regulator comprises an amplifier and a pass transistor configured to pass a current that is inversely proportional to an output of the amplifier; a clamping circuit configured to limit an overdrive voltage of the pass transistor during an inrush current event; and an override circuit configured to deactivate the clamping circuit in the bypass mode when the current passed by the pass transistor is below a current threshold.

Example 2

The USB-PD IC controller of example 1, wherein the override circuit is configured to mirror a fraction of the current passed by the pass transistor, compare the mirrored current with a reference current, and electrically couple the variable input voltage to the clamping circuit when the mirrored current is higher than the reference current.

Example 3

The USB-PD IC controller of example 2, wherein the override circuit is configured to generate an error current based on the difference between the mirrored current and a fixed reference which corresponds to the reference current, generate an adjustment signal proportional to the error current, and adjust the overdrive voltage limit implemented by the clamping circuit based on the adjustment signal such that the error current is reduced.

Example 4

The USB-PD IC controller of example 3, wherein the override circuit further comprises a closed loop negative feedback system configured to further reduce the error current.

Example 5

The USB-PD IC controller of any of examples 1 through 4, wherein the override circuit comprises: a current mirror transistor configured to mirror a fraction of the current passed by the pass transistor; a comparator configured to compare the mirrored current with a reference current; and a deactivation switch electrically coupled in series between the variable input voltage and the clamping circuit and configured to close when the current comparator indicates the mirrored current is higher than the reference current.

Example 6

The USB-PD IC controller of example 5, wherein the pass transistor and the current mirror transistor are each a p-channel MOSFET, and wherein the override circuit further comprises a cascode circuit configured to increase drain matching between the pass transistor and the current mirror transistor.

Example 7

The USB-PD IC controller of example 6, wherein the override circuit further comprises an error reduction circuit electrically coupled to the cascode circuit and configured to mirror an error current which corresponds to the difference between the mirrored current and the reference current, and wherein the error reduction circuit is configured to further adjust the overdrive voltage limit implemented by the clamping circuit based on the error current.

Example 8

The USB-PD IC controller of example 7, wherein the error reduction circuit comprises a first p-channel MOSFET having a gate controlled by the error current, a source electrically coupled to the variable input voltage, and a drain electrically coupled to both a current source that generates the reference current and a gate of the pass transistor.

Example 9

The USB-PD IC controller of example 8, wherein the error reduction circuit further comprises a first n-channel MOSFET into which the error current flows, a second n-channel MOSFET configured to mirror the error current flowing in the first n-channel MOSFET, and a second p-channel MOSFET having a source electrically coupled to the variable input voltage and a gate and a drain electrically coupled together to a drain of the second n-channel MOSFET, wherein the first n-channel MOSFET, the second n-channel MOSFET, the first p-channel MOSFET and the second p-channel transistor form a gain stage, and wherein a magnitude of the error current is inversely proportional to a gain of the gain stage.

Example 10

The USB-PD IC controller of example 9, wherein the error reduction circuit is configured to sense the current flowing in the pass transistor and the second p-channel MOSFET, and to generate an error signal for controlling the reference current to reduce an inrush limiting error of the override circuit.

Example 11

The USB-PD IC controller of any of examples 4 through 10, wherein the pass transistor is a first p-channel MOSFET having a source electrically coupled to the variable input voltage, a drain at which the internal supply voltage is provided, and a gate electrically coupled to the output of the amplifier, and wherein the clamping circuit comprises a second p-channel MOSFET having a gate and a drain electrically together to the gate of the first p-channel MOSFET and a source electrically coupled to the deactivation switch of the override circuit.

Example 12

The USB-PD IC controller of any of examples 1 through 11, wherein the override circuit comprises a sense resistor in series with the pass transistor and is configured to deactivate the clamping circuit in the bypass mode when a voltage across the sense resistor is below a voltage threshold.

Example 13

The USB-PD IC controller of any of examples 1 through 12, wherein the clamping circuit is configured to alter a reference input of the amplifier of the regulator when the inrush current event is detected, to limit the overdrive voltage of the pass transistor.

Example 14

The USB-PD IC controller of any of examples 1 through 13, further comprising: a bias generator configured to generate a bias current for the amplifier of the regulator, the bias current ranging from a minimum bias current for a deep sleep mode in which the regulator is in a low drive mode with no-load current to a maximum bias current for an active mode.

Example 15

The USB-PD IC controller of example 14, wherein the bias generator is configured to linearly adjust the bias current in proportion to a magnitude of the current passed by the pass transistor.

Example 16

The USB-PD IC controller of example 14 or 15, wherein the bias generator is configured to set the bias current to the minimum bias current plus (1/m)*iload where iload is a magnitude of the current passed by the pass transistor and 1/m is a size difference ratio between the pass transistor and a current mirror transistor configured to mirror a fraction of the current passed by the pass transistor.

Example 17

The USB-PD IC controller of example 16, wherein the bias generator is configured to set the bias current to the maximum bias current when the sum of the minimum bias current plus (1/m)*iload is above a threshold value.

Example 18

The USB-PD IC controller of example 17, wherein the threshold value is set to the maximum bias current.

Example 19

The USB-PD IC controller of any of examples 1 through 18, wherein the variable input voltage ranges from 3.6V to 40V.

Example 20

The USB-PD IC controller of any of examples 1 through 19, wherein the internal supply voltage is regulated to 5V in the regulation mode, and wherein the regulator is in the bypass mode when the variable input voltage is below 5V.

Example 21

A method of operating a Universal Serial Bus (USB)—Power Delivery (PD) integrated circuit (IC) controller, the method comprising: controlling, by the USB-PD IC controller, external switches of a buck-boost converter electrically coupled to a USB voltage bus power line; regulating, via a regulator of the USB-PD IC controller, an internal supply voltage of the USB power delivery system from a variable input voltage of the buck-boost converter in a regulation mode and passing the variable input voltage as the internal supply voltage without regulation in a bypass mode, wherein the regulator is in the bypass mode when the variable input voltage is below the internal supply voltage, wherein the regulator comprises an amplifier and a pass transistor that passes a current that is inversely proportional to an output of the amplifier; limiting, by the USB-PD IC controller, an overdrive voltage of the pass transistor during an inrush current event; and deactivating the limiting of the overdrive voltage in the bypass mode when a scaled down replica of the current passed by the pass transistor is below a reference current.

Example 22

The method of example 21, wherein deactivating the limiting of the overdrive voltage in the bypass mode comprises: mirroring a fraction of the current passed by the pass transistor to generate the scaled down replica; comparing the scaled down replica with the reference current; and deactivating the limiting of the overdrive voltage in the bypass mode when the comparing of the scaled down replica with the reference current indicates the scaled down replica is lower than the reference current.

Example 23

The method of example 22, further comprising: generating an error current based on a difference between the scaled down replica and a fixed reference which corresponds to the reference current; generating an adjustment signal proportional to the error current; and adjusting the limiting of the overdrive voltage based on the adjustment signal such that the error current is reduced.

Example 24

A Universal Serial Bus (USB)-Power Delivery (PD) device comprising: a buck-boost converter; and a USB-PD integrated circuit (IC) controller coupled to control operation of the buck-boost converter, the USB-PD IC controller comprising: a regulator configured to regulate an internal supply voltage of the USB-PD IC controller from a variable input voltage of the buck-boost converter in a regulation mode, and to pass the variable input voltage as the internal supply voltage without regulation in a bypass mode, wherein the regulator is in the bypass mode when the variable input voltage is below the internal supply voltage, wherein the regulator comprises an amplifier and a pass transistor configured to pass a current that is inversely proportional to an output of the amplifier; a clamping circuit configured to limit an overdrive voltage of the pass transistor during an inrush current event; and an override circuit configured to deactivate the clamping circuit in the bypass mode when the current passed by the pass transistor is below a current threshold.

Example 25

The USB-PD device of example 24, wherein the override circuit is configured to mirror a fraction of the current passed by the pass transistor, compare the mirrored current with a reference current, and electrically couple the variable input voltage to the clamping circuit when the mirrored current is higher than the reference current.

Example 26

The USB-PD device of example 25, wherein the override circuit is configured to generate an error current based on the difference between the mirrored current and a fixed reference which corresponds to the reference current, generate an adjustment signal proportional to the error current, and adjust the overdrive voltage limit implemented by the clamping circuit based on the adjustment signal such that the error current is reduced.

Example 27

The USB-PD device of any of examples 24 through 26, further comprising a USB Type-C port coupled to the buck-boost converter.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A Universal Serial Bus (USB)-Power Delivery (PD) integrated circuit (IC) controller, the USB-PD IC controller comprising:
   one or more driver circuits configured to control operation of a buck-boost converter;
   a regulator configured to regulate an internal supply voltage of the USB-PD IC controller from a variable input voltage of the buck-boost converter in a regulation mode, and to pass the variable input voltage as the internal supply voltage without regulation in a bypass mode, wherein the regulator is in the bypass mode when the variable input voltage is below the internal supply voltage, wherein the regulator comprises an amplifier and a pass transistor configured to pass a current that is inversely proportional to an output of the amplifier;
   a clamping circuit configured to limit an overdrive voltage of the pass transistor during an inrush current event; and
   an override circuit configured to deactivate the clamping circuit in the bypass mode when the current passed by the pass transistor is below a current threshold.

2. The USB-PD IC controller of claim 1, wherein the override circuit is configured to mirror a fraction of the current passed by the pass transistor, compare the mirrored current with a reference current, and electrically couple the variable input voltage to the clamping circuit when the mirrored current is higher than the reference current.

3. The USB-PD IC controller of claim 2, wherein the override circuit is configured to generate an error current based on the difference between the mirrored current and a fixed reference which corresponds to the reference current, generate an adjustment signal proportional to the error current, and adjust the overdrive voltage limit implemented by the clamping circuit based on the adjustment signal such that the error current is reduced.

4. The USB-PD IC controller of claim 3, wherein the override circuit further comprises a closed loop negative feedback system configured to further reduce the error current.

5. The USB-PD IC controller of claim 1, wherein the override circuit comprises:
   a current mirror transistor configured to mirror a fraction of the current passed by the pass transistor;
   a comparator configured to compare the mirrored current with a reference current; and
   a deactivation switch electrically coupled in series between the variable input voltage and the clamping circuit and configured to close when the current comparator indicates the mirrored current is higher than the reference current.

6. The USB-PD IC controller of claim 5, wherein the pass transistor and the current mirror transistor are each a p-channel MOSFET, and wherein the override circuit further comprises a cascode circuit configured to increase drain matching between the pass transistor and the current mirror transistor.

7. The USB-PD IC controller of claim 6, wherein the override circuit further comprises an error reduction circuit electrically coupled to the cascode circuit and configured to mirror an error current which corresponds to the difference between the mirrored current and the reference current, and wherein the error reduction circuit is configured to further adjust the overdrive voltage limit implemented by the clamping circuit based on the error current.

8. The USB-PD IC controller of claim 7, wherein the error reduction circuit comprises a first p-channel MOSFET having a gate controlled by the error current, a source electrically coupled to the variable input voltage, and a drain electrically coupled to both a current source that generates the reference current and a gate of the pass transistor.

9. The USB-PD IC controller of claim 8, wherein the error reduction circuit further comprises a first n-channel MOSFET into which the error current flows, a second n-channel MOSFET configured to mirror the error current flowing in the first n-channel MOSFET, and a second p-channel MOSFET having a source electrically coupled to the variable input voltage and a gate and a drain electrically coupled together to a drain of the second n-channel MOSFET, wherein the first n-channel MOSFET, the second n-channel MOSFET, the first p-channel MOSFET and the second p-channel transistor form a gain stage, wherein a magnitude of the error current is inversely proportional to a gain of the gain stage, and wherein the error reduction circuit is configured to sense the current flowing in the pass transistor and the second p-channel MOSFET, and to generate an error signal for controlling the reference current to reduce an inrush limiting error of the override circuit.

10. The USB-PD IC controller of claim 1, wherein the override circuit comprises a sense resistor in series with the pass transistor and is configured to deactivate the clamping circuit in the bypass mode when a voltage across the sense resistor is below a voltage threshold.

11. The USB-PD IC controller of claim 1, wherein the clamping circuit is configured to alter a reference input of the amplifier of the regulator when the inrush current event is detected, to limit the overdrive voltage of the pass transistor.

12. The USB-PD IC controller of claim 1, further comprising:
   a bias generator configured to generate a bias current for the amplifier of the regulator, the bias current ranging from a minimum bias current for a deep sleep mode in which the regulator is in a low drive mode with no-load current to a maximum bias current for an active mode.

13. The USB-PD IC controller of claim 12, wherein the bias generator is configured to linearly adjust the bias current in proportion to a magnitude of the current passed by the pass transistor.

14. The USB-PD IC controller of claim 12, wherein the bias generator is configured to set the bias current to the minimum bias current plus $(1/m)*iload$ where iload is a magnitude of the current passed by the pass transistor and $1/m$ is a size difference ratio between the pass transistor and a current mirror transistor configured to mirror a fraction of the current passed by the pass transistor, wherein the bias generator is configured to set the bias current to the maximum bias current when the sum of the minimum bias current plus (1/m)*iload is below a threshold value.

15. The USB-PD IC controller of claim 1, wherein the variable input voltage ranges from 3.6V to 40V.

16. The USB-PD IC controller of claim 1, wherein the internal supply voltage is regulated to 5V in the regulation mode, and wherein the regulator is in the bypass mode when the variable input voltage is below 5V.

17. A method of operating a Universal Serial Bus (USB)-Power Delivery (PD) integrated circuit (IC) controller, the method comprising:
controlling, by the USB-PD IC controller, external switches of a buck-boost converter electrically coupled to a USB voltage bus power line;
regulating, via a regulator of the USB-PD IC controller, an internal supply voltage of the USB power delivery system from a variable input voltage of the buck-boost converter in a regulation mode and passing the variable input voltage as the internal supply voltage without regulation in a bypass mode, wherein the regulator is in the bypass mode when the variable input voltage is below the internal supply voltage, wherein the regulator comprises an amplifier and a pass transistor that passes a current that is inversely proportional to an output of the amplifier;
limiting, by the USB-PD IC controller, an overdrive voltage of the pass transistor during an inrush current event; and
deactivating the limiting of the overdrive voltage in the bypass mode when a scaled down replica of the current passed by the pass transistor is below a reference current.

18. The method of claim 17, wherein deactivating the limiting of the overdrive voltage in the bypass mode comprises:
mirroring a fraction of the current passed by the pass transistor to generate the scaled down replica;
comparing the scaled down replica with the reference current; and
deactivating the limiting of the overdrive voltage in the bypass mode when the comparing of the scaled down replica with the reference current indicates the scaled down replica is lower than the reference current.

19. The method of claim 18, further comprising:
generating an error current based on a difference between the scaled down replica and a fixed reference which corresponds to the reference current;
generating an adjustment signal proportional to the error current; and
adjusting the limiting of the overdrive voltage based on the adjustment signal such that the error current is reduced.

20. A Universal Serial Bus (USB)-Power Delivery (PD) device, comprising:
a buck-boost converter; and
a USB-PD integrated circuit (IC) controller coupled to control operation of the buck-boost converter, the USB-PD IC controller comprising:
a regulator configured to regulate an internal supply voltage of the USB-PD IC controller from a variable input voltage of the buck-boost converter in a regulation mode, and to pass the variable input voltage as the internal supply voltage without regulation in a bypass mode, wherein the regulator is in the bypass mode when the variable input voltage is below the internal supply voltage, wherein the regulator comprises an amplifier and a pass transistor configured to pass a current that is inversely proportional to an output of the amplifier;
a clamping circuit configured to limit an overdrive voltage of the pass transistor during an inrush current event; and
an override circuit configured to deactivate the clamping circuit in the bypass mode when the current passed by the pass transistor is below a current threshold.

21. The USB-PD device of claim 20, wherein the override circuit is configured to mirror a fraction of the current passed by the pass transistor, compare the mirrored current with a reference current, and electrically couple the variable input voltage to the clamping circuit when the mirrored current is higher than the reference current.

22. The USB-PD device of claim 21, wherein the override circuit is configured to generate an error current based on the difference between the mirrored current and a fixed reference which corresponds to the reference current, generate an adjustment signal proportional to the error current, and adjust the overdrive voltage limit implemented by the clamping circuit based on the adjustment signal such that the error current is reduced.

23. The USB-PD device of claim 20, further comprising a USB Type-C port coupled to the buck-boost converter.

* * * * *